Dec. 10, 1957 J. H. LUCAS 2,815,913

ELECTRONIC ADDING CIRCUITS

Filed Sept. 24, 1954

Inventor
JOHN H. LUCAS
By

United States Patent Office 2,815,913

Patented Dec. 10, 1957

2,815,913

ELECTRONIC ADDING CIRCUITS

John Harold Lucas, Caterham, England, assignor to Powers-Samas Accounting Machines Limited, London, England, a British company Application September 24, 1954, Serial No. 458,102

Claims priority, application Great Britain October 19, 1953

1 Claim. (Cl. 235—61)

This invention relates to electronic adding circuits for performing binary addition.

Binary addition by electronic means has been previously proposed, and in a paper entitled "Universal high-speed digital computors: Serial computing circuits" published in the Proceedings of the Institute of Electrical Engineers, volume 99, part II, No. 68—April 1952, there are described electronic techniques for performing binary addition, and, in some instances using circuits described as "half-adders," a term which is employed because two co-operating half-adders are required to perform the complete addition of two binary digits and the carry which may arise from the addition of digits of a lower denominational order.

The said prior proposal which is adapted for high-speed digital computing and which employs vacuum tubes could be employed in statistical machines controlled by perforated or other suitable records but in general it is not possible in such machines to use to advantage the full capabilities of such a computer because the rate of operation of the machine is governed by the speed at which data can be sensed from records for use by the computer, and also by the speed at which the recording mechanism, for example printing or punching devices, which is usually mainly mechanical, can be operated.

It is an object of the present invention to provide a binary adding circuit which although not possessing the very high-speed capabilities of that mentioned above is suitable for use in a record-controlled statistical machine and is a simpler circuit than that previously proposed and one which is less costly to produce. The basis of the new adding circuit is a novel half-adder circuit as will be described below.

According to the present invention a binary adding circuit first and a second half-adder each having a cold-cathode gas-filled digit output triode, a cold-cathode gas-filled carry output triode, a diode coincidence gate to control the potential of the trigger electrode of the carry output triode, a diode mixing circuit cooperating with the coincidence circuit to control the potential of the trigger electrode of the digit output triode, a resistor common to the cathode circuits of the carry output and digit output triodes to raise the cathode potential of the digit output triode, thereby to inhibit the triggering of the digit output triode when the carry output triode is conducting as a result of a potential transmitted to its trigger electrode from the coincidence gate, and a delay circuit linking the diode mixing circuit to the trigger electrode of the digit output triode to prevent triggering of the digit output triode prior to the establishment of the inhibiting potential therefor, wherein the digit output from the first half-adder is connected to one side of the coincidence gate of the second half-adder and to the mixing circuit therefor, a carry input line is connected to the other side of said coincidence gate and to said mixing circuit, and the carry outputs from each of the half-adders are connected with a carry mixing circuit the output from which provides a carry input to a second binary adding circuit.

In order that the invention may be clearly understood one embodiment thereof will now be described, by way of example, with reference to the accompanying drawings, in which.

Figures 1, 2, 3:
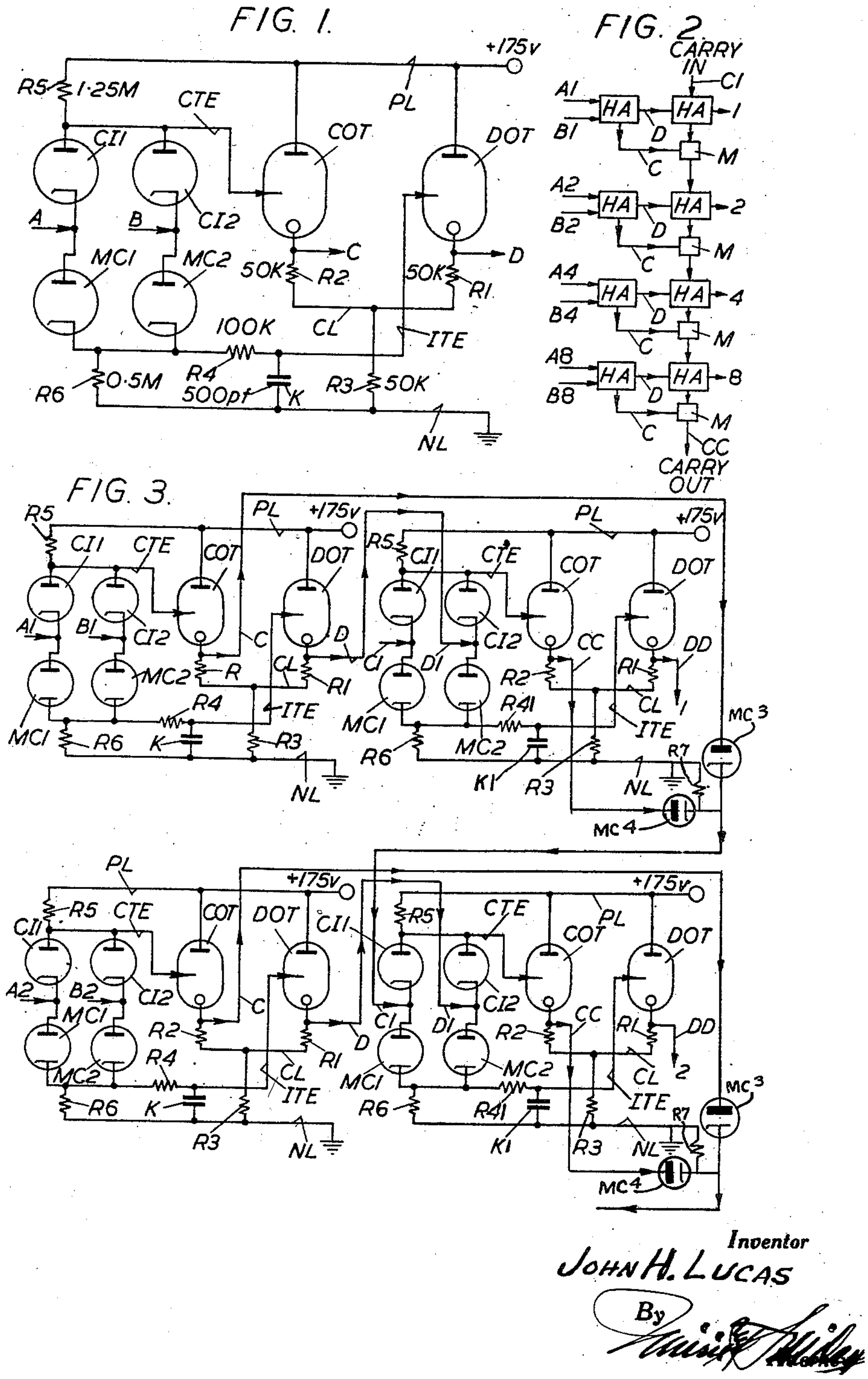
Fig. 1 is a circuit diagram of a half-adder according to the invention.
Fig. 2 is a block diagram illustrating a four-stage binary adding circuit embodying half-adders as shown in Fig. 1.
Fig. 3 is a circuit diagram illustrating the first two stages of the circuit according to Fig. 2.

Referring to Fig. 1 the half-adder circuit illustrated therein comprises a cold-cathode gas-filled digit output triode DOT and a cold-cathode gas-filled carry output triode COT the anodes of which are connected to a common positive line PL. The cathodes of the triodes are connected by a common line CL through resistors R1, R2 and through a common resistor R3 to a negative line NL.

Triggering of triodes DOT is controlled by a mixing circuit consisting of two diodes MC1, MC2 the cathodes of which are connected to the trigger electrode of the triode DOT through a resistor R4, capacitor K, and line ITE. The resistor R4 and capacitor K act as a delay circuit for a purpose to be described below. The anodes of the diodes MC1, MC2 are connected respectively with the cathodes of two further diodes CI1, CI2 which have their anodes connected to the trigger electrode of triode COT through line CTE and which form a coincidence gate to control the potential applied to the trigger electrode of the triode COT. The diodes are connected with the positive line PL through a resistor R5 and with the negative line NL through a resistor R6.

For convenience of description it is assumed that the resistors and capacitor have the values shown in Fig. 1, that the positive line has applied thereto +175 v., that the internal voltage drop of triodes DOT and COT is 75 v. and that the triggering potential of the triodes is 75 v.

The half-adder circuit is arranged to receive digit inputs at A and/or B and gives a digit output at D or a carry output at C according to the normal binary addition table:

| Input | | Output | |
|---|---|---|---|
| A | B | C | D |
| 0 | 0 | 0 | 0 |
| 1 | 0 | 0 | 1 |
| 0 | 1 | 0 | 1 |
| 1 | 1 | 1 | 0 |

With the supply voltage, tube characteristics and resistance values given, a potential of +100 v. at C or D signifies an output, while +50 v. or less signifies no output and the operation of the half-adder circuit is as follows:

If the potential at either A or B, but not at both, is raised to +100 v., no rise of potential is transmitted through the coincidence gate CI1, CI2 but the rise of potential is transmitted through the mixing circuit MC1, MC2, and through the delay circuit R4, K to the trigger electrode of triode DOT so that the triode DOT is triggered and gives an output at D of +100 v. At this time the voltage at C is only +50 v. and accordingly does not signify an output.

If A and B are raised simultaneously to +100 v. the coincidence gate functions to transmit the rise of potential to the trigger electrode of triode COT so that COT is triggered and gives an output of +100 v. at C. It will be understood that simultaneously with the transmission of potential through the coincidence gate there is a like transmission through the mixing circuit to line ITE. However, the rise of potential along line ITE is delayed by the delay circuit R4, K so that it cannot reach DOT until after COT has been triggered. During this period of delay the current through resistor R3 and triode COT has established at D a voltage of +50 v. which serves to inhibit the triggering of triode DOT, thus ensuring that the voltage at D cannot rise to +100 v. thereby to give a digit output.

For convenience the diodes CI1, CI2, MC1, MC2, MC3, and MC4 have been illustrated as thermionic diodes but to further reduce the size and cost of the circuit assembly there may, if desired, be used diodes of any other type, for example, selenium diodes.

Figs. 2 and 3 illustrate a four-stage binary adder built up on the basis of the half-adder circuit described above. From Fig. 2, which is a block diagram, it will be seen that each binary stage consists of a first and a second half-adder circuit of which the first is described with reference to Fig. 1, and the second differs therefrom only in that the delay circuit R41, K1, Fig. 3, therein introduces a longer time delay than the delay circuit R4, K in the first half-adder. Carries from one stage to the next higher stage are effected through a carry mixing circuit M of any suitable form for example as described below. Since the input and output levels of each half-adder are standardised at the same values, direct connections are permissible throughout the adding circuit of Figs. 2 and 3.

From Fig. 2 it will be observed that it is being assumed that the digit outputs from the four binary stages are representative of digits according to the 1–2–4–8 code, and that the inputs to the four stages are independent and simultaneous to permit digits to be entered and added in parallel, thus it will be noted that the A and B inputs for the four stages are indicated respectively as A1, B1; A2, B2; A4, B4; and A8, B8. The outputs from the four binary stages are up in potential only during the times when potentials are applied to the inputs, and the potentials of the inputs are raised for a time sufficient to allow a through carry to pass through the four stages of the adder. The digit output triodes of each of the second half-adders are inhibited from triggering by the delay circuits R41, K1 until a through carry has been effected.

Fig. 3 illustrates the manner of connection between the half-adder circuits comprising the first two stages of the circuit shown in block form in Fig. 2, it being understood that the third stage is connected to the second stage in the same way as the second stage is connected to the first stage, and that the fourth stage is similarly connected to the third stage.

Referring to Fig. 3, the digit output D from the first half-adder circuit of the first stage binary adder becomes the digit input D1 to the second half-adder circuit of said first stage and the carry output C passes to diode MC3 of a carry mixing circuit indicated by the general reference M in Fig. 2 which consists of two diodes MC3 and MC4 whose cathodes are connected together and to one end of a load resistor R7, the other end of which is connected to earth. The second input for the second half-adder circuit consists of a carry input C1 which is applied simultaneously with an input A and/or B to the first half-adder circuit and is derived from an adding circuit of next lower denomination. It is to be understood that the adding circuit of lowest denomination will not receive an input C1, unless it is required that the adder incorporate and end-around carry from the adding circuit of highest denomination.

The digit output from the first stage binary adder is at DD and is transmitted to any desired receiver such as a storage register, or to means arranged to control recording means such as a printing mechanism or a punching device which, in the example being described, co-operates with a decoder arranged, as is well understood in the art, to decode the digit outputs from the binary stages from the 1–2–4–8 code into the decimal or other equivalents thereof.

The carry output CC from the second half-adder of the first binary stage is fed to the diode MC4 of the carry-mixing circuit M and the output from the carry-mixing circuit M becomes the carry input C1 for the next binary stage.

In order to describe the mode of operation of the adding circuit illustrated in Figs. 2 and 3 let it be assumed that the adding device is incorporated in a record card controlled machine in which a digit recorded on one column of a card is to be added to a digit record on a second column of the card. As is well understood the digits are usually recorded on the card according to their normal numerical significance and after sensing will be coded according to the code employed in the adding device, in the example being described this is the 1–2–4–8 code.

As a first example let it be assumed that in one card column there is recorded the digit 1 and in the other column no digit is recorded. In this instance there will be an input at A1 but not at B1 and, assuming there is no carry input C1 from the circuit of next lower denomination, there will be a digit output D to D1 and the potentials of lines D1 and DD will be raised at times successively later than that at which the potential of the input A1 is raised, due to the operation of the delay circuits R4, K and R41, K1. If, however, there should be a carry input at C1 there will be no digit output at DD but as there will be simultaneous inputs at C1, D1 the triode COT in the second half-adder of this stage is triggered to give an output CC before the potential of line ITE has risen sufficiently to trigger triode DOT, so that even though the potential of the input C1 rises before that of the line D1, the triode DOT is not triggered, due to the action of the delay circuit R41, K1. Accordingly there will be a carry output CC through carry mixer M to the second binary stage where it becomes an input at C1 and is converted to a digit output at DD of the second binary stage thus representing digit 2, the sum of the sensed digit 1 and the carry from the next lower adding circuit.

As a second example let it be assumed that a digit 1 is recorded in both card columns. In this instance there will be an input A1 and an input B1 and, assuming there is no carry input C1 from the circuit of next lower denomination, there will be no digit output D or DD but there will be a carry output C which passes through the carry-mixing circuit M to become a carry input C1 in the second binary stage where, as described above, it is converted into a digit output DD representative of digit 2 the sum of the two sensed digits. If, however, there should be a carry input C1 to the first binary stage such input will be converted to a digit output DD from the first binary stage so that there will be a digit output from the first and the second binary stages which, when decoded, represent digit 3, the sum of the two sensed digits 1 and the carry from the adding circuit of next lower denomination.

As a third example, let it be assumed that digit 2 is sensed from one card column and that digit 3 is sensed from the second card column. When coded these digits will be represented by an input A2 and B2 in the second binary stage and an input B1 in the first binary stage. The input B1 in the first binary stage becomes an output DD therefrom and the inputs A2 and B2 in the second binary stage become a carry output C from that stage through carry-mixer M to the third binary stage where it becomes an input C1 which is converted into a digit output DD from the third binary stage. These two outputs DD when decoded represent digit 5, the sum of the two digits sensed from the card. In this instance, should there be a carry-input C1 to the first binary stage there will be no digit output DD from this stage but a carry output CC through carry-mixer M to become a carry input C1 to the second binary stage, this input being converted into a digit output DD from the second binary stage so that there is a digit output from the second and the third binary stages representative of digit 6, the sum of the two digits sensed from the card and the carry from the adding circuit of next lower denomination.

In the foregoing examples there has been considered the possibility of a carry input C1 and it will be understood that the delay circuits R41, K1 are so chosen as to provide sufficient time to permit the carry in C1, if need be, to carry through to the last stage of the adding circuit.

When the result is obtained it remains registered in the adding circuit until the circuit is reset by reducing the potential of the positive line PL.

Although the adding circuit described above includes a plurality of binary stages it will be understood that in some instances as, for example, when an adding circuit is required for tens-of-shillings in a sterling adder, an adding circuit may consist of one binary stage only.

I claim:

A binary adding circuit including a first and a second half-adder each having a cold cathode gas-filled digit output triode, a cold cathode gas-filled carry output triode, a diode coincidence gate to control the potential of the trigger electrode of the carry output triode, a diode mixing circuit cooperating with the coincidence circuit to control the potential of the trigger electrode of the digit output triode, a resistor common to the cathode circuits of the carry output and digit output triodes to raise the cathode potential of the digit output triode thereby to inhibit the triggering of the digit output triode when the carry ouput triode is conducting as a result of a potential transmitted to its trigger electrode from the coincidence gate, and a delay circuit linking the diode mixing circuit to the trigger electrode of the digit output triode to prevent triggering of the digit output triode prior to the establishing of the inhibiting potential therefor, wherein the digit output from the first half-adder is connected to one side of the coincidence gate of the second half-adder and to the mixing circuit therefor, a carry input in connected to the other side of said coincidence gate and to said mixing circuit, and the carry outputs from each of the half-adders are connected with a carry-mixing circuit the output from which provides a carry input to a second binary adding circuit.

References Cited in the file of this patent

UNITED STATES PATENTS 2,694,521 Newman et al. ---------- Nov. 16, 1954

OTHER REFERENCES

Engineering Research Associates, E. R. A. High Speed Computing Devices; McGraw-Hill Book Co., Inc., New York; Copyright 1950, page 272.